United States Patent
Satoh

[11] Patent Number: 5,936,743
[45] Date of Patent: Aug. 10, 1999

[54] FACSIMILE CONTROL SYSTEM

[75] Inventor: Masaki Satoh, Kawasaki, Japan

[73] Assignee: Ricoh Company, Ltd., Tokyo, Japan

[21] Appl. No.: 08/770,344

[22] Filed: Dec. 20, 1996

[30] Foreign Application Priority Data

Dec. 22, 1995 [JP] Japan .................................. 7-335416

[51] Int. Cl.$^6$ .............................. H04N 1/32; H04N 1/00; H04N 1/40
[52] U.S. Cl. ......................... 358/434; 358/468; 358/404; 358/442; 358/405; 358/448
[58] Field of Search ............................ 379/93.01, 93.17, 379/93.24, 93.25, 100.01, 100.02, 100.03; 358/400, 405, 434, 435, 436, 438, 439, 468, 442, 448; 395/200.02, 200.04, 200.1, 200.2

[56] References Cited

U.S. PATENT DOCUMENTS 5,189,663   2/1993   Williams ................................. 370/17
5,598,533   1/1997   Yokota et al. ....................... 395/200.08

FOREIGN PATENT DOCUMENTS

| 4265040 | 9/1992 | Japan | H04L 29/06 |
| 514576 | 1/1993 | Japan | H04N 1/00 |
| 6177995 | 6/1994 | Japan | H04M 11/00 |
| 6233040 | 8/1994 | Japan | H04N 1/00 |

*Primary Examiner*—Thomas D. Lee
*Assistant Examiner*—Jerome Grant, II
*Attorney, Agent, or Firm*—Cooper & Dunham LLP

[57] ABSTRACT

A facsimile system includes a facsimile apparatus including a printer for receiving and printing facsimile information and a terminal apparatus remote from the facsimile apparatus, for transmitting data to and receiving data from the facsimile apparatus. The facsimile apparatus includes a data transmit device for transmitting data related to a condition of a public telephone line connected to the facsimile apparatus in response to a request from the terminal apparatus.

9 Claims, 6 Drawing Sheets

FACSIMILE CONTROL SYSTEM

BACKGROUND OF THE INVENTION

1. Field of the Invention

The present invention relates to a facsimile system and, more specifically, to a facsimile apparatus which can be connected with an operation terminal (e.g., a personal computer) such that the facsimile apparatus and operation terminal can transmit and receive various types of data between each other.

2. Description of the Related Art

In a conventional facsimile system which connects a personal computer with a facsimile apparatus by RS 232 C interface, a facsimile driver program is installed on the personal computer. The personal computer uses the facsimile apparatus as a facsimile modem. The personal computer can thus transmit image data to an external (or remote) facsimile or facsimile modem over a public telephone line.

Japanese Patent Laid-Open Publication No. 6-233040 relates to a facsimile apparatus which is connected to one or more personal computers by a LAN (Local Area Network). Each personal computer may access the facsimile apparatus via the LAN and use the facsimile apparatus as a facsimile server.

In Japanese Patent Laid-Open Publication No. 4-265040, a facsimile apparatus is connected to one or more personal computers by a LAN interface. Each personal computer may use the facsimile apparatus as a gate-way device for communicating to another facsimile apparatus or facsimile modem.

In Japanese Patent Laid-Open Publication No. 5-14576, a facsimile apparatus transmits maintenance information to an external terminal having a facsimile function, through a public telephone line.

In Japanese Patent Laid-Open Publication No. 6-177995, a personal computer is capable of resetting or restoring data controlling the settings of an external terminal, through a public telephone line.

In such systems, it is possible to read image data from a document and transmit the image data to an external facsimile only if the public telephone line is not busy.

However, in these types of facsimile apparatuses or systems, a user must be physically present at the facsimile apparatus when the user needs to confirm the condition of the public telephone line (e.g., determine whether the telephone line is busy or not).

Furthermore, a user must be physically present at the facsimile apparatus, when the user needs to confirm and change and/or restore the facsimile settings which are stored in the memory of the facsimile apparatus.

Furthermore, a user must be physically present at the facsimile apparatus to receive a communication report or an error report generated be the facsimile apparatus.

Furthermore, a user must be physically present at the facsimile apparatus, for example, when the user needs to operate the facsimile apparatus to transmit a document.

In addition, many facsimile apparatuses include an energy savings mode in which a heater element used for printing a toner image is shut off when not printing. When a facsimile is received, the image data is stored and the heater element is turned on. When the temperature of the heater element reaches a predetermined temperature, the image data is read from memory and printed by the facsimile apparatus. However, this can be quite time consuming and annoying for the user of the facsimile apparatus.

The present invention has been made in view of the above-mentioned problems, and an object of the present invention is to provide a facsimile system in which functions of the facsimile apparatus can be performed by a remote operation of the facsimile apparatus from the terminal apparatus (e.g., from a personal computer).

SUMMARY OF THE INVENTION

According to an embodiment of the present invention a facsimile system comprises a facsimile apparatus including a printer for receiving and printing facsimile information and a terminal apparatus remote from the facsimile apparatus, for transmitting data to and receiving data from the facsimile apparatus. The facsimile apparatus includes a data transmit device for transmitting data related to a condition of a public telephone line connected to the facsimile apparatus in response to a request from the terminal apparatus.

According to another embodiment of the present invention a facsimile system comprises a terminal apparatus, remote from a facsimile apparatus, for transmitting data to and receiving data from the facsimile apparatus. The terminal apparatus includes a data transmit device for transmitting a request command to the facsimile apparatus requesting to receive information relating to the settings of the facsimile apparatus. The facsimile apparatus comprises a set up device for transmitting the information related to the settings of the facsimile apparatus in response to the request command from the terminal apparatus.

According to yet another embodiment of the present invention a facsimile system comprises a terminal apparatus, remote from a facsimile apparatus, for transmitting data to and receiving data from the facsimile apparatus. The terminal apparatus includes a data transmit device for transmitting a request command to the facsimile apparatus requesting to receive information relating to a condition of the facsimile apparatus. The facsimile apparatus includes a device for transmitting data related to the condition of the facsimile apparatus in response to the request from the terminal apparatus.

According to still another embodiment of the present invention a facsimile system comprises a terminal apparatus, remote from a facsimile apparatus, for transmitting data to and receiving data from the facsimile apparatus. The facsimile apparatus includes a first data transmitting device for transmitting operational panel information data related to the facsimile apparatus to the terminal apparatus. The terminal apparatus includes a second data transmitting device for transmitting key data for performing an operation with the facsimile apparatus. The facsimile apparatus further includes a control device for performing a predetermined procedure based on the key data input from the second data transmitting device.

According to another embodiment of the present invention a facsimile system comprises a terminal apparatus, remote from a facsimile apparatus, for transmitting data to and receiving data from the facsimile apparatus. The facsimile apparatus includes a first data transmitting device for transmitting operational panel information data related to the facsimile apparatus to the terminal apparatus. The terminal apparatus includes a second data transmitting device for transmitting key data for performing an operation with the facsimile apparatus. The facsimile apparatus further includes a control device for performing a predetermined procedure based on the key data input from the second data transmitting device.

Accordingly, it is possible to receive at the terminal apparatus data related to the condition of a public telephone line from the facsimile apparatus so that a user is able to confirm the condition of a public telephone line (busy or not) without leaving his/her seat.

In addition, it is also possible to receive data indicating the settings currently being used by the facsimile apparatus so that the settings can be confirmed or changed remotely from the terminal apparatus. Accordingly, the user can change the settings of the facsimile apparatus without leaving his/her seat.

In this system, it is also possible to receive at the terminal apparatus various types of report data related to the facsimile apparatus so that the user can review the reports without leaving his/her seat.

In this system, it is also possible to control the heater of the facsimile apparatus from the terminal apparatus without leaving his/her seat.

DETAILED DESCRIPTION OF THE PREFERRED EMBODIMENTS

Figure 2:
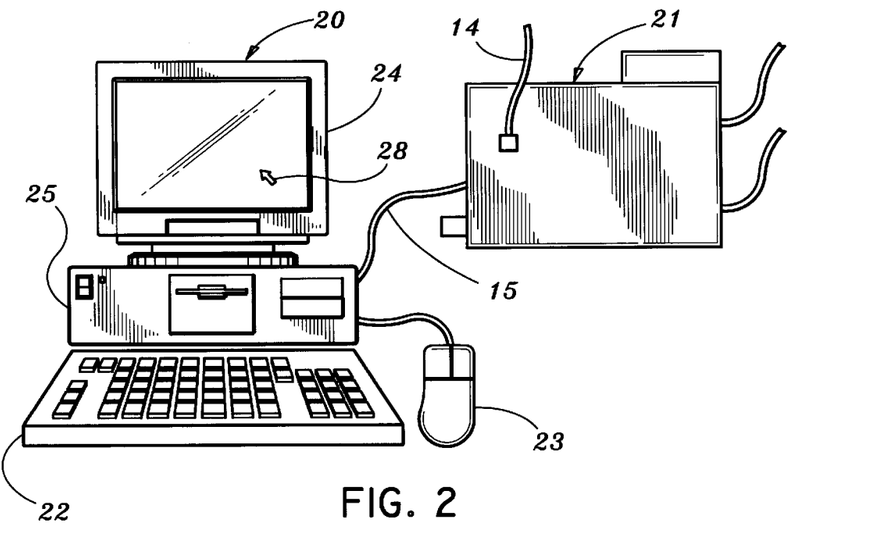
FIG. 2, is a schematic elevational view of a personal computer and a facsimile apparatus according to an embodiment of the present invention.

The preferred embodiments of the present invention will now be described by reference to the accompanying drawings, in which FIG. 2 shows a schematic elevational view of a facsimile system according to an embodiment of the present invention.

According to this embodiment of the present invention, personal computer 20 (e.g., a terminal apparatus) is connected with a facsimile apparatus 21 by PC cable 15. Personal computer 20 and facsimile apparatus 21 are capable of transmitting various types of data between each other via PC cable 15. As will be described in more detail below, personal computer 20 can remotely control facsimile apparatus 21.

Personal computer 20 includes a keyboard 22 for inputting information and a mouse 23 for positioning a cursor 28 on a display 24 (e.g., a CRT/LCD). Display 24 displays various types of information or messages input by keyboard 22 and/or mouse 23 and information or messages input from other sources.

Personal computer 20 also includes control processing unit 25 consisting of a CPU (Central Processing Unit), RAM (Random Access Memory), and ROM (Read Only Memory). Of course, personal computer 20 may also include various other components, such as a CD ROM drive, an audio system, etc. Such personal computers are well known in the art and therefore will not be described in further detail.

Facsimile apparatus 21 is capable of scanning or reading an image from a document and transmitting the image to an external facsimile apparatus through public telephone line 14. Facsimile apparatus 21 is also capable of receiving facsimile data from an external remote facsimile apparatus or computer functioning as a facsimile apparatus. Facsimile apparatus then saves the data in memory and/or prints the information.

Facsimile apparatus 21 is also capable of functioning as a facsimile modem for personal computer 20 so that documents created on personal computer 20 can be transmitted as a facsimile communication to another personal computer having a facsimile function or to another facsimile apparatus. That is, documents created on personal computer 20 are transmitted to facsimile apparatus 21 via PC cable 15. Facsimile apparatus 21 functions as a facsimile modem transmitting the documents to an external remote facsimile apparatus or personal computer (not shown). In addition, facsimile apparatus 21, functioning as a fax modem, receives documents from a remote facsimile via public telephone line 14 and transmits the documents to personal computer 20 via PC cable 15. Accordingly, personal computer 20 may receive and store and/or display a document received from an external remote facsimile apparatus or personal computer.

Figure 3:
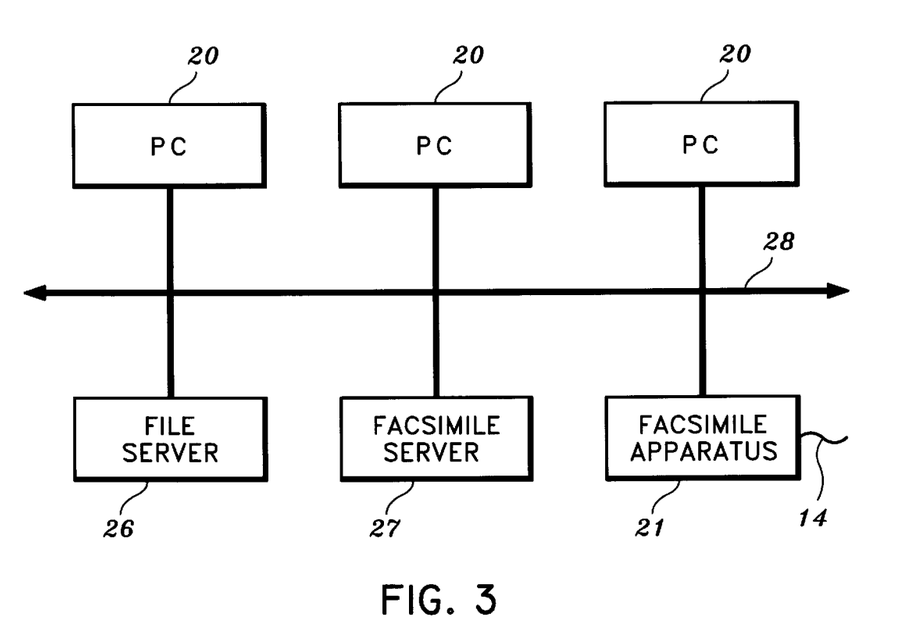
FIG. 3 is a block diagram of a plurality of personal computers connected with a file server, facsimile server and facsimile apparatus via a local area network.

FIG. 3 shows a block diagram of a facsimile system according to another embodiment of the present invention.

According to this embodiment of the present invention, a plurality of personal computers 20 are connected with a file server 26, a facsimile server 27, and a facsimile apparatus 21 through a LAN (Local Area Network) 28. Each personal computer 20 thus has access to facsimile apparatus 21, file server 26 and facsimile server 27, so that documents and information can be transmitted and received. In addition, with the aid of facsimile server 27, each personal computer can remotely control facsimile apparatus 21.

For example, facsimile server 27 is capable of controlling the transfer of data across the network so that each personal computer 20 can communicate with and remotely control facsimile apparatus 21. Facsimile apparatus 21 can also function as a facsimile modem for each personal computer 20 so that documents created on each personal computer can be transmitted via public telephone line 14. For example, each personal computer 20 can transmit data (e.g., a document or image) to facsimile apparatus 21 over the LAN 28. The data can then be transmitted by facsimile apparatus 21 to an external remote facsimile apparatus as facsimile data, via public telephone line 14.

Facsimile server 27 is also capable of controlling the transfer of data across the network so that data received by facsimile apparatus 21 can be sent to a specified personal computer 20. In this way, facsimile apparatus 21 functions as a facsimile modem so that personal computers 20 can also receive and store and/or display a document received by facsimile apparatus 21.

Figure 1:
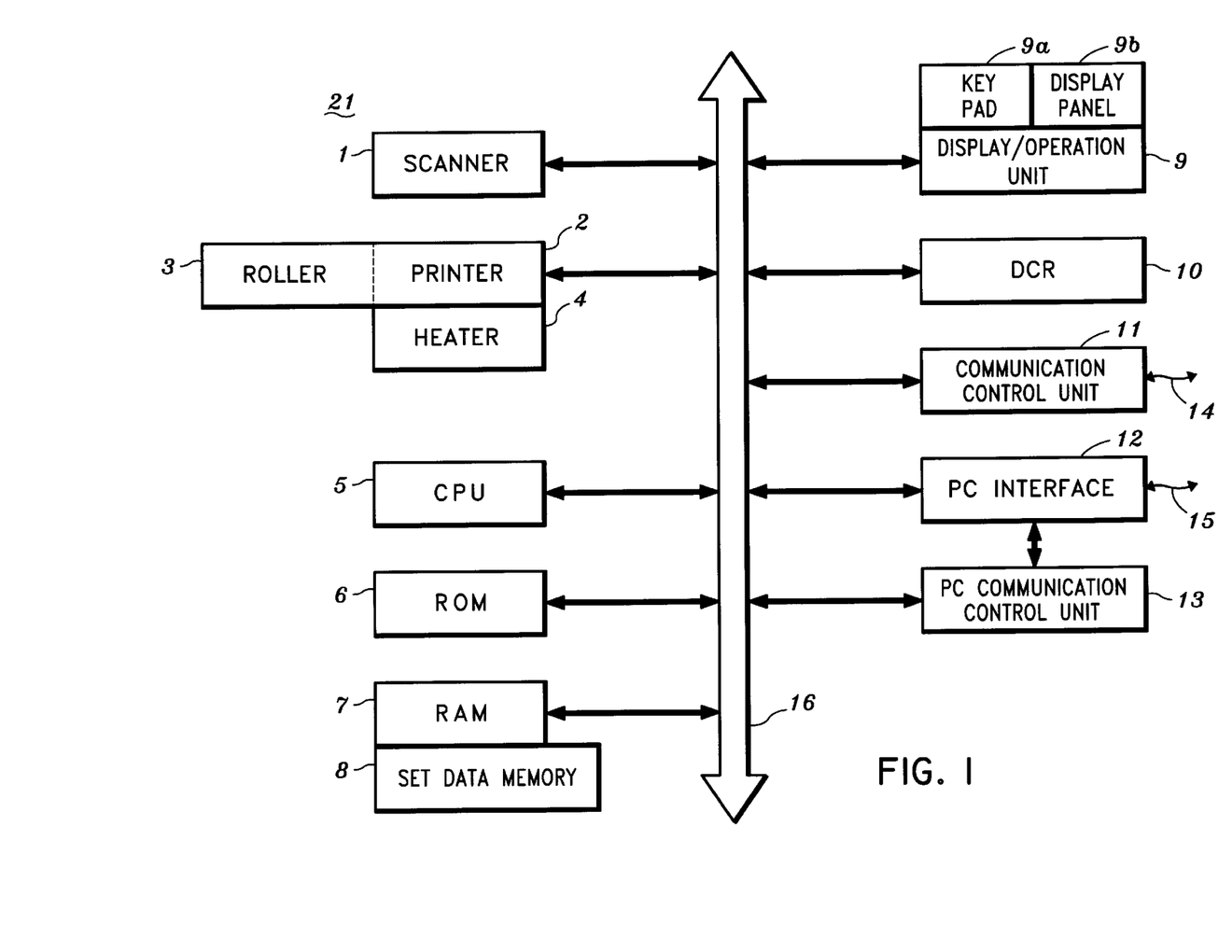
FIG. 1 is a block diagram of a facsimile apparatus according to an embodiment of the present invention.

FIG. 1 shows a block diagram of the facsimile apparatus 21 according to an embodiment of the present invention. An example of a facsimile apparatus suitable for use by the present invention is Ricoh Company's Model MV-74 copier/printer/facsimile apparatus. Model MV-74 can be programmed to implement each of the functions described below.

Facsimile apparatus 21 includes a scanner 1, a printer 2, a CPU (Central Processing Unit) 5, a ROM (Read Only Memory) 6, a RAM (Random Access Memory) 7, a set data memory 8, a display/operation unit 9 including keypad 9a and display panel 9b, DCR (Data Compression and Reconstruction) circuitry 10, a communication control unit 11, a PC interface 12, and a PC communication control unit 13. Data transmission between these components within the facsimile apparatus is mainly performed via internal bus 16.

Communication control unit 11 allows facsimile apparatus 21 to transmit information to and receive information from an external remote facsimile apparatus or a personal computer operating as a facsimile apparatus, via public telephone line 14. PC interface 12 connects to personal computer 20 or to LAN 28, via PC cable 15. PC communication control unit 13 controls PC interface 12 to control the flow of information between personal computer 20 or LAN 28 and PC interface 12.

Scanner 1 reads image data from a document at a predetermined selected resolution and stores the image data in RAM 7. The stored image data can then be transmitted to a remote facsimile apparatus by communication control unit 11, via public telephone line 14.

Printer 2 includes a roller 3 and a heater 4 for fixing a toner image onto a sheet of paper. Printer 2 receives image data from an external remote facsimile apparatus via public telephone line 14, from RAM 7 or from personal computer 20 via PC cable 15, and prints the received image data onto a sheet of paper. The printer 2 can also print a report (e.g., a communication report, an error report, etc.) based on data internal to facsimile apparatus 21.

CPU 5 performs control processing for controlling each component of facsimile apparatus 21 during operation, and also during an energy saving mode in which heater element 4 of printer 2 is turned off when printer 2 is not printing. ROM 6 stores a control processing program which CPU 5 executes. ROM 6 also stores various types of data which can be displayed by display panel 9b on facsimile apparatus 21 so that control and error information can be displayed to the user.

As noted above, RAM 7 stores image data received from the external remote facsimile apparatus, image data scanned by scanner 1 and various types of data which can be used by CPU 5 when executing the control processing program. Set data memory 8 (RAM) stores data which controls all of the settings of the facsimile apparatus. The settings include, for example, phone numbers, resolution information, etc. CPU 5 stores the set data in RAM 8 based on data received from personal computer 20 or based on data received from keypad 9a.

Keypad 9a of display/operation unit 9 includes various operation keys and switches which the user can manipulate to operate facsimile apparatus 21. As noted above, display/operation unit 9 also includes display panel 9b for displaying control and error information to the user.

DCR 10 codes scanned image data, for example, using a Modified Huffman code (MH), a Modified Read code (MR) or a Modified Modified Read code (MMR) and then compresses the coded image data. The coded and compressed image data can then be stored in Ram 7 and/or transmitted by PC communication control unit via PC cable 15 or by communication control unit 11 via public telephone line 14. DCR 10 also decompresses and decodes coded and compressed image data back to the original image data so that it can be displayed and/or printed.

Communication control unit 11 performs a facsimile communication processing control procedure for transmitting and receiving data over the public telephone line 14.

PC interface 12 is connected to personal computer 20 via cable 15 so that personal computer 20 and facsimile apparatus 21 can communicate and transmit data between each other.

PC communication control unit 13 performs the actual data communication processing control procedure so that information can be communicated between facsimile apparatus 21 and personal computer 20 via PC cable 15.

Personal computer 20 controls facsimile apparatus 21 using a request command which is well-known as a class 1 or a class 2 type command. The facsimile command is also well-known as an expanded AT command.

According to this embodiment of the present invention, personal computer 20 can transmit a command other than the AT command to facsimile apparatus 21 and receive various types of data back from facsimile apparatus 21.

Figure 4:
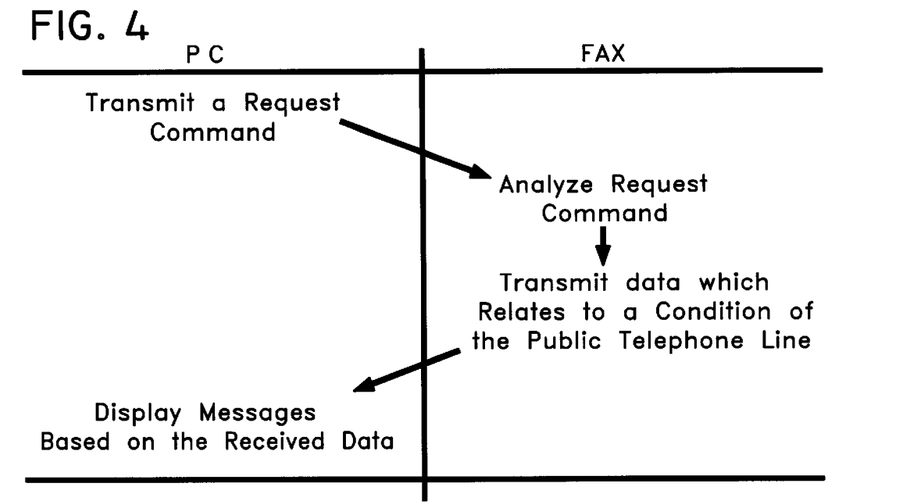
FIG. 4 is an operational flow chart according to an embodiment of the present invention.

FIG. 4 shows an example of an operational flowchart of a procedure which is performed by the facsimile system according to an embodiment of the present invention.

In response to a request from a user input from keyboard 22 and/or mouse 23 (FIG. 2), personal computer 20 transmits a request command to facsimile apparatus 21 via PC cable 15, requesting data indicating the condition of public telephone line 14 connected to facsimile apparatus 21.

PC interface 12 (FIG. 1) of facsimile apparatus 21 receives the request command and PC communication control unit 13 analyzes the received request command. In response, CPU 5 requests communication control unit 11 to check the condition of public telephone line 14. Communication control unit 11 dials the desired telephone number to determine if it is busy or not. In addition, CPU 5 can determine whether facsimile apparatus 21 is presently transmitting or receiving data over public telephone line 14. Facsimile apparatus 21 then transmits data to personal computer 20 via PC cable 15 indicating the condition of the public telephone line.

Based on the received data, personal computer 20 then displays one or more messages on display 24 indicating to the user the condition of the public telephone line.

Accordingly, a user may check the condition of the public telephone line connected to facsimile apparatus 21, without leaving his/her seat.

A user may confirm the condition of the public telephone line at regular intervals of time, without having to perform a manual operation. For example, facsimile apparatus 21 can be programmed to automatically continue checking the condition of public telephone line 14 at predetermined intervals of time, in response to a request from the user. Facsimile apparatus 21 can then transmit the condition information when the public telephone line is free or each time after it has been checked. In the alternative, personal computer 20 can be programmed to automatically transmit the request command at predetermined intervals of time. Facsimile apparatus 21 can then analyze each request, check the condition of the public telephone line and transmit telephone line condition information each time the request command is received.

Figure 5:
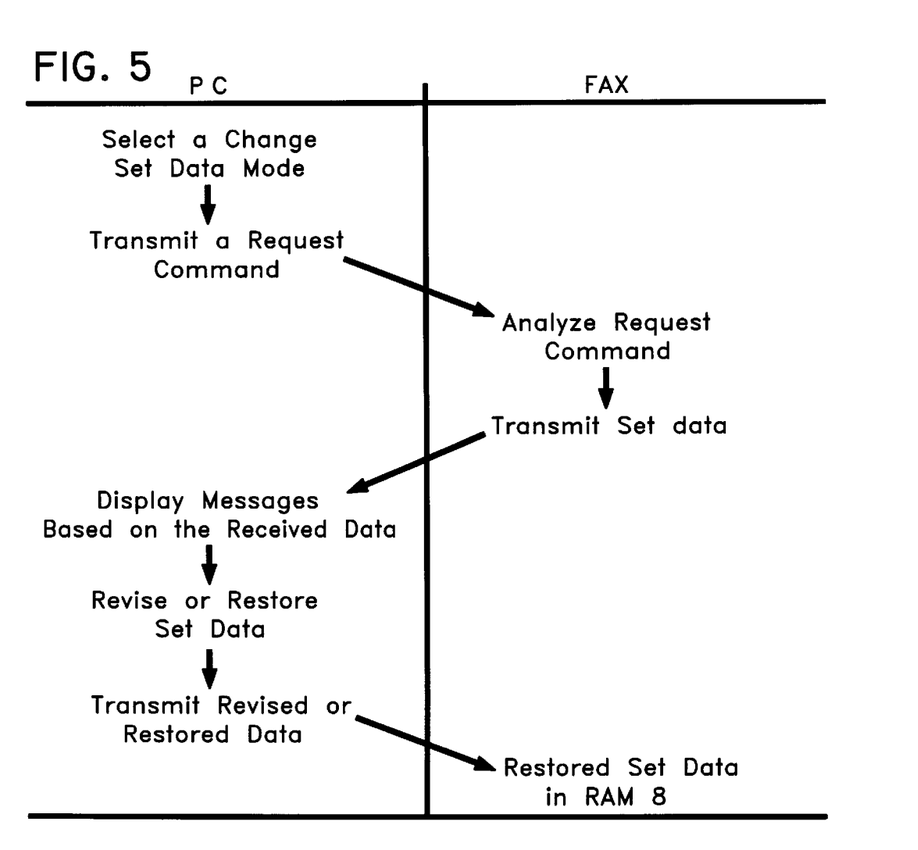
FIG. 5 is an operational flow chart according to another embodiment of the present invention.

FIG. 5 shows an operational flowchart of another procedure performed for confirming and changing and/or restoring the settings of facsimile apparatus 21.

A user of personal computer 20 may select a data request mode requesting to review some or all of the settings currently stored in set data memory 8 of facsimile apparatus 21, by inputting a command via keyboard 22 and/or mouse 23. In response, personal computer 20 transmits a request command requesting facsimile apparatus 21 to transmit some or all of the settings information stored in set data memory 8. Facsimile apparatus 21 receives the request command via PC cable 15 and PC communication control unit 13 analyzes the request command. In response thereto, CPU 5 reads the settings data from set data memory 8 and PC communication control unit 13 transmits the settings data to personal computer 20 via PC cable 15.

Personal computer 20 receives the settings data and displays messages and the settings on display 24 so that the user can view the current settings of facsimile apparatus 21.

At this time, if a user desires to change any of the settings, the user inputs the new settings information via keyboard 22 and/or mouse 23 and personal computer 20 transmits the inputted settings data to facsimile apparatus 21 via PC cable 15. Facsimile apparatus 21 receives the new settings data and CPU 5 writes the settings data into set data memory 8.

According to this embodiment of the present invention, a user may remotely confirm and/or restore or change the settings data stored in set data memory 8 of facsimile apparatus 21, without leaving his/her seat.

Figure 6:
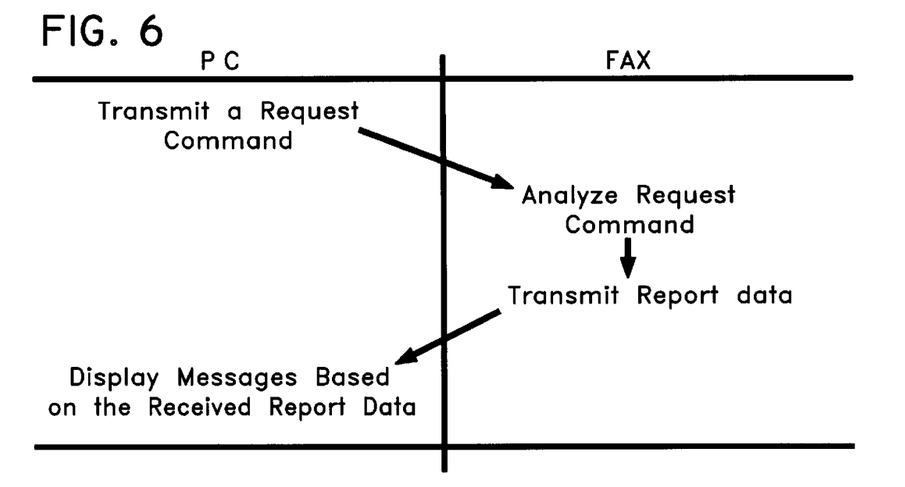
FIG. 6 is an operational flow chart according to still another embodiment of the present invention.

FIG. 6 shows an operational flowchart according to another embodiment of the present invention for viewing a report generated by facsimile apparatus 21, with personal computer 20. For example, a user may desire to view a communication report indicating the status of a document or documents transmitted or received by facsimile apparatus 21.

A user may select a request command requesting to view one or more types of reports generated by facsimile apparatus 21, by inputting a command via keyboard 22 and/or mouse 23. In response, personal computer 20 transmits a request command requesting facsimile apparatus 21 to transmit report data back to personal computer 20.

Facsimile apparatus 21 receives the request command via PC cable 15 and PC communication control unit 13 analyzes the request command. In response, CPU 5 reads out all or a portion of the report data which is typically stored in RAM 7 or ROM 6 for example. The report data is then transmitted to personal computer 20 by PC communication control unit 13 via PC cable 15.

Personal computer 20 receives the report data and displays one or more messages on display 24 based on the received report data.

In addition to a user being able to request all of the error reports generated by facsimile apparatus 21, a user can specifically request any one report. For example, a user may only desire to see whether a document transmission just attempted by facsimile apparatus 21 has been successfully completed. In this case, personal computer 20 transmits along with the request command, identification data identifying which report is desired.

Facsimile apparatus 21 receives the request command via PC cable 15, PC communication control unit 13 analyzes the request command and CPU 5 reads the desired report data from RAM 7. PC communication control unit 13 then transmits the specified report data to personal computer 20 via PC cable 15.

Accordingly, a user may review only the specific report data that he or she desires.

In addition, the system can be arranged so that the report data is automatically sent to personal computer 20 each time facsimile apparatus 21 generates such a report.

Accordingly, a user may view one or more reports generated by facsimile apparatus 21 without leaving his/her seat.

Figure 7:
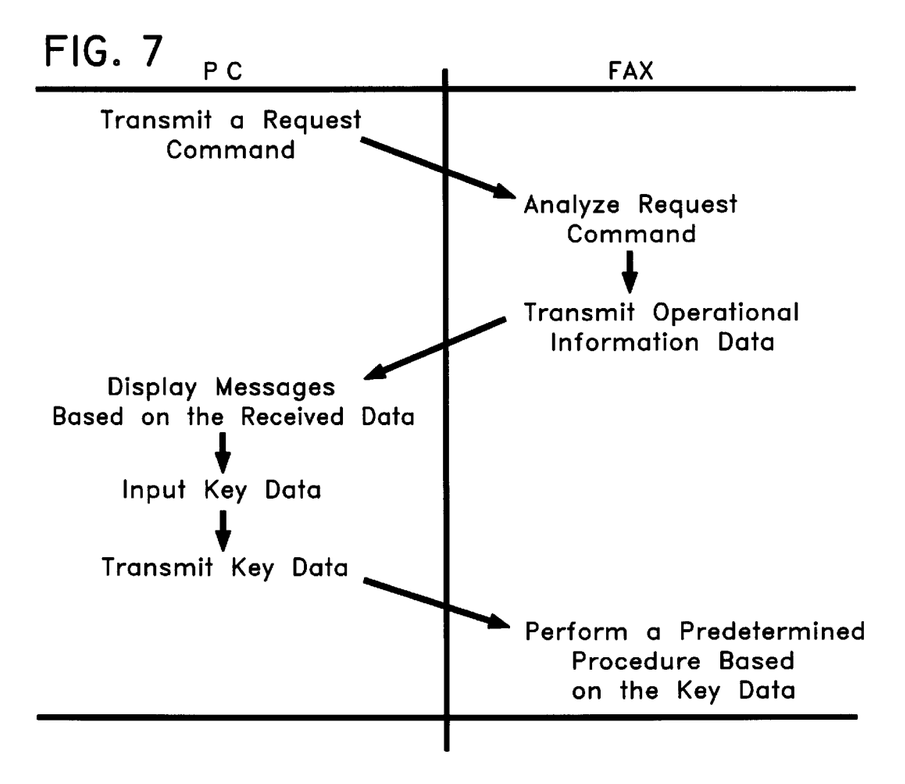
FIG. 7 is an operational flow chart according to another embodiment of the present invention.

FIG. 7 shows an operational flowchart according to an embodiment of the present invention in which personal computer 20 can view various operational information and remotely operate facsimile apparatus 21.

Figure 8:
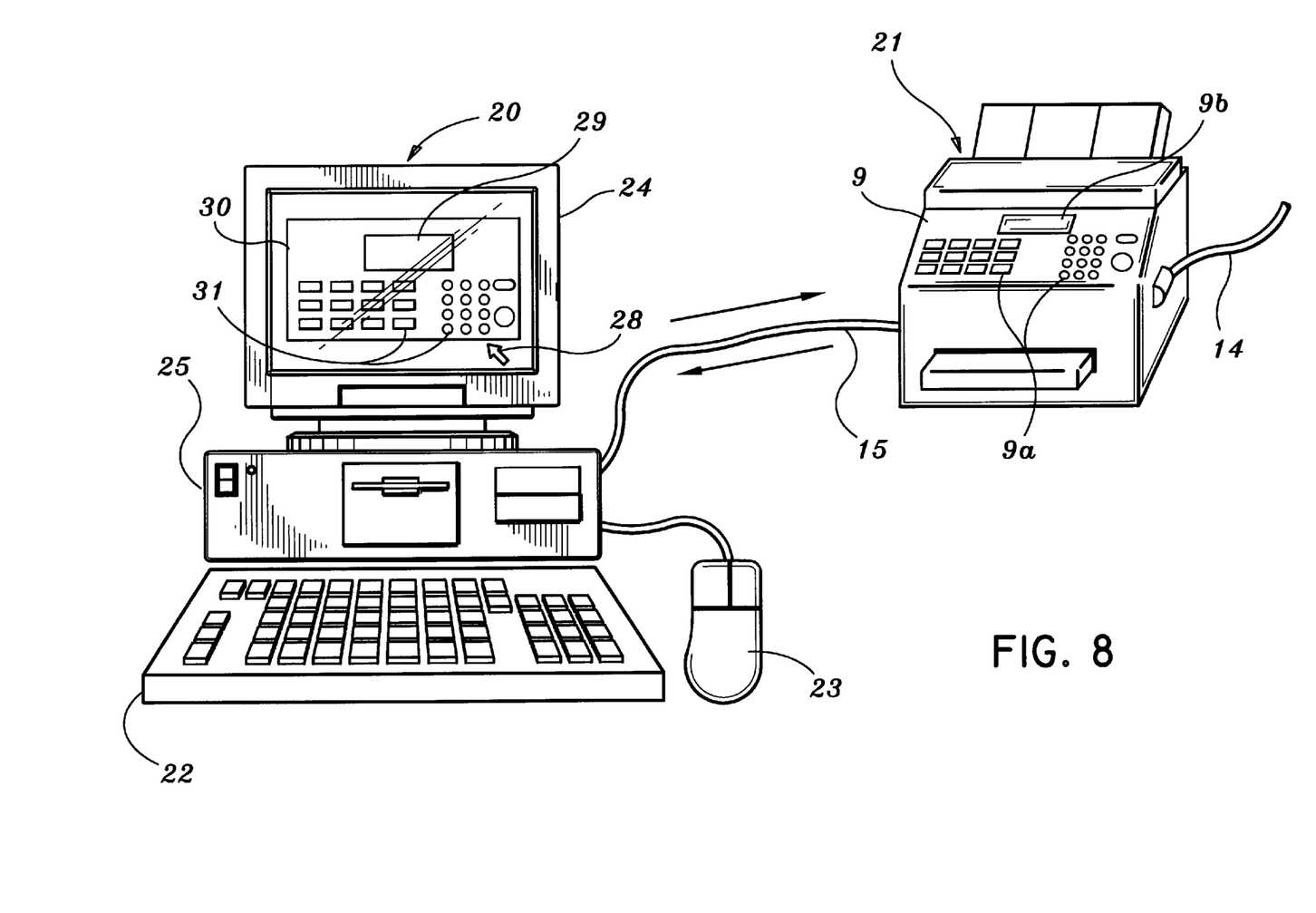
FIG. 8 is a schematic representation of a facsimile system according to an embodiment of the present invention.

According to this embodiment of the present invention, a user selects a facsimile emulation mode by inputting an appropriate command using keyboard 22 and/or mouse 23. In response, personal computer 20 displays on display 24, a display panel similar to panel 9B of facsimile apparatus 21. FIG. 8 shows a schematic representation of the display panel 30 which is displayed on display unit 24.

Personal computer 20 transmits a request command to facsimile apparatus 21 selecting the facsimile emulation mode and requesting facsimile apparatus 21 to transmit operational data to personal computer 20.

Facsimile apparatus 21 receives the request command via PC cable 15 and PC communication control unit 13 analyzes the request command. The operational data, which is also currently being displayed on the display/operation unit 9 on display panel 9b of facsimile apparatus 21, is then transmitted to personal computer 20 via PC cable 15.

Personal computer 20 then displays the received operational data on the emulation display panel 29, so that display panel 29 is displaying the same information being displayed by display 9b on facsimile apparatus 21.

A user can then input information with keyboard 22 or by moving curser 28 on display 24 to an appropriate key or button 31 displayed on panel 30 and then clicking on the desired key or button. Personal computer 20 then transmits key data related to the inputted key information to facsimile apparatus 21, via PC cable 15. Facsimile apparatus 21 receives the inputted key information and executes a predetermined procedure corresponding to the input key information.

Accordingly, the user may remotely control facsimile apparatus 21 from personal computer 20.

Figure 9:
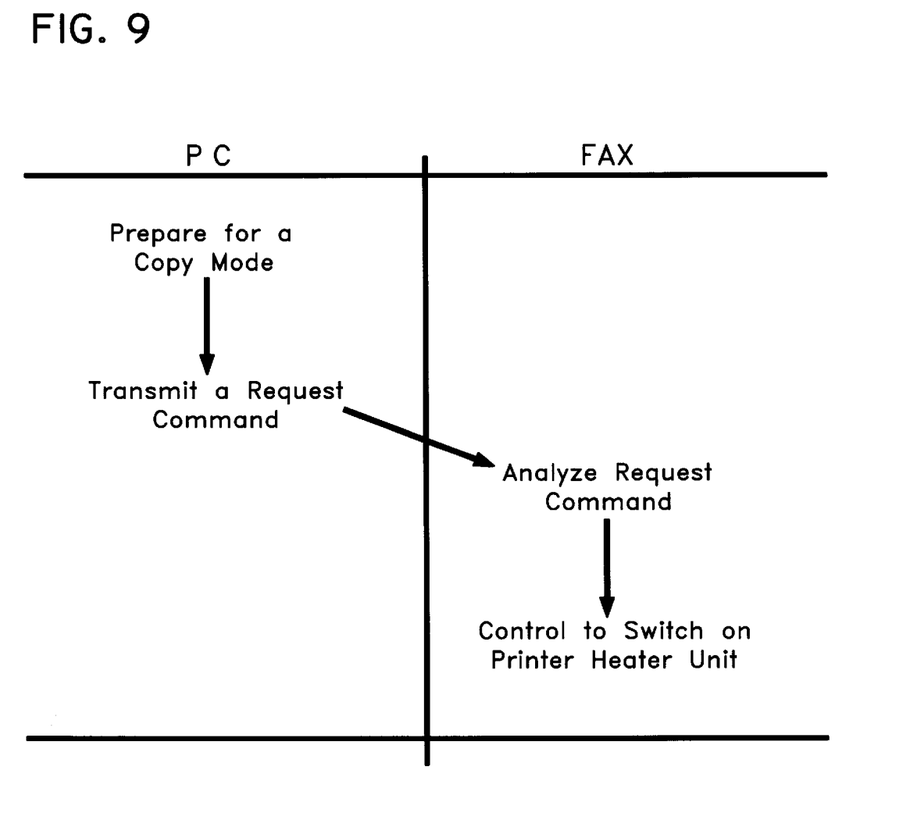
FIG. 9 is an operational flow chart according to an embodiment of the present invention.

FIG. 9 shows an operational flowchart according to another embodiment of the present invention for remotely operating the printer heater element of facsimile apparatus 21 from personal computer. Accordingly, a user can prepare the facsimile apparatus in anticipation of receiving a facsimile.

A user requests facsimile apparatus 21 to prepare for copying or printing by transmitting a request command to facsimile apparatus 21. Personal computer 20 transmits a request command requesting facsimile apparatus 21 to switch on heater 4 of facsimile apparatus 21 when a user inputs a proper command from keyboard 22 and/or mouse 23.

Facsimile apparatus 21 receives the request command via PC cable 15 and PC communication control unit 13 analyzes the request command. CPU 5 then checks a condition of the heater (i.e., determines whether the heater is on or off). If CPU 5 determines that the heater unit 4 is off, CPU 5 issues a command to turn it on.

PC communication control unit 13 can also then transmit condition data to personal computer 20 indicating that heater unit 4 is warming up. In addition, when the heater unit 4 arrives at a predetermined temperature, PC communication control unit 13 can transmit data to personal computer 21 indicating that preparation of the copy mode is complete.

Personal computer 20 receives the condition data. Personal computer 20 then displays one or more messages indicating to the user that the preparation of the copy mode is finished. Facsimile apparatus 21 is then ready to print data as soon as it is received.

Accordingly, the user may remotely control the heater of the facsimile apparatus 21 without leaving his/her seat, which saves the user both time and effort.

While for purposes of illustration and explanation, several forms of this invention have been disclosed, other forms thereof may become apparent to those skilled in the art upon reference to this disclosure and, therefore, this invention is to be limited only by the scope of the appended claims.

What is claimed is:

1. A facsimile control system comprising:
    a facsimile unit comprising,
        a printer for receiving and printing facsimile information,
        a facsimile memory provided in said facsimile unit for storing facsimile related information, and
        a serial port for receiving and sending information including said facsimile related information;
    a communication control unit configured to perform communication control including dialing a desired telephone number to determine if the number is busy; and
    a terminal apparatus remote from the facsimile apparatus, comprising,
        a serial port connected with said serial port of said facsimile unit for transmitting data to and receiving data from the facsimile unit,
        a processing unit for transmitting data to said facsimile unit via said serial port and capable of receiving information from said facsimile unit via said serial port, including the facsimile related information stored in said facsimile memory, the processing unit capable of transmitting a request command to the facsimile unit requesting the communication control unit to determine if a desired telephone number is busy and of receiving a response to the request from the facsimile unit; and
        a display for displaying information to a user, including information transmitted to said terminal apparatus from said facsimile unit via said serial port.

2. A facsimile control system as recited in claim 1, wherein the facsimile unit comprises a stand alone combination fax/printer/copier unit.

3. A facsimile control system as recited in claim 1, wherein the terminal apparatus transmits a request command to the facsimile unit requesting to receive information relating to the settings of the facsimile unit stored in said facsimile memory and said facsimile unit transmits the information related to the settings of the facsimile unit in response to the request command from the terminal apparatus.

4. A facsimile control system as recited in claim 1, wherein said terminal apparatus transmits a request command to the facsimile unit requesting to receive information relating to a condition of the facsimile unit and the facsimile unit transmits the data related to the condition of the facsimile unit in response to the request from the terminal apparatus.

5. A facsimile control system as recited in claim 1, wherein said facsimile unit transmits operational panel information data related to the facsimile unit to the terminal apparatus for output to an operator via said display, and said terminal apparatus further comprises an inputting device for inputting and transmitting key data to the facsimile unit for performing an operation with the facsimile unit, the facsimile unit further comprising a control device for performing a predetermined procedure based on the key data input from terminal apparatus.

6. A facsimile control system comprising:
    a facsimile unit comprising,
        printer means for receiving and printing facsimile information,
        facsimile memory means provided in said facsimile unit for storing facsimile related information, and
        serial port means for receiving and sending information including said facsimile related information; and
        communication control means for performing communication control including dialing a desired telephone number to determine if the number is busy; and
    a terminal apparatus remote from the facsimile apparatus, comprising, serial port means connected with said serial port of said facsimile unit for transmitting data to and receiving data from the facsimile unit,
    processing means for transmitting data to said facsimile unit via said serial port means and capable of receiving information from said facsimile unit via said serial port means, including the facsimile related information stored in said facsimile memory means, the processing means capable of transmitting a request command to the facsimile unit requesting the communication control means to determine if a desired telephone number is busy and of receiving a response to the request from the facsimile unit;
    display means for displaying information to a user, including information transmitted to said terminal apparatus from said facsimile unit via said serial port means.

7. A facsimile control system as recited in claim 6, wherein the terminal apparatus transmits a request command to the facsimile unit requesting to receive information relating to the settings of the facsimile unit stored in said facsimile memory means and said facsimile unit transmits the information related to the settings of the facsimile unit in response to the request command from the terminal apparatus.

8. A facsimile control system as recited in claim 6, wherein said terminal apparatus transmits a request command to the facsimile unit requesting to receive information relating to a condition of the facsimile unit and the facsimile unit transmits the data related to the condition of the facsimile unit in response to the request from the terminal apparatus.

9. A facsimile control system as recited in claim 6, wherein said facsimile unit transmits operational panel information data related to the facsimile unit to the terminal apparatus for output to an operator via said display, and said terminal apparatus further comprises an inputting device for inputting and transmitting key data to the facsimile unit for performing an operation with the facsimile unit, the facsimile unit further comprising a control device for performing a predetermined procedure based on the key data input from terminal apparatus.

* * * * *